P. A. PRINCE.
Sheer-Boom.

No. 164,211. Patented June 8, 1875.

WITNESSES:
E. Wolff
A. F. Terry

INVENTOR:
P. A. Prince
BY Munn
ATTORNEYS.

UNITED STATES PATENT OFFICE.

PETER A. PRINCE, OF PORTER'S MILLS, WISCONSIN.

IMPROVEMENT IN SHEER-BOOMS.

Specification forming part of Letters Patent No. 164,211, dated June 8, 1875; application filed March 20, 1875.

*To all whom it may concern:*

Be it known that I, PETER A. PRINCE, of Porter's Mills, in the county of Eau Claire and State of Wisconsin, have invented a new and useful Improvement in Sheer-Booms, of which the following is a specification:

This invention is designed for rivers and other waters, to facilitate the operations of the lumbermen in receiving and securing saw-logs; and consists in a boom provided with one or more center-boards, working through diagonal slots in the boom, and operated by means of a revolving chain connected therewith, by ropes or chains passing over pulleys, the chain being revolved by means of a crank supported by a stand on the boom, the said boom having a hitching device attached to one end, with a roller, which allows the boom to rise and fall according to the rise and fall of the water.

Figure 1:
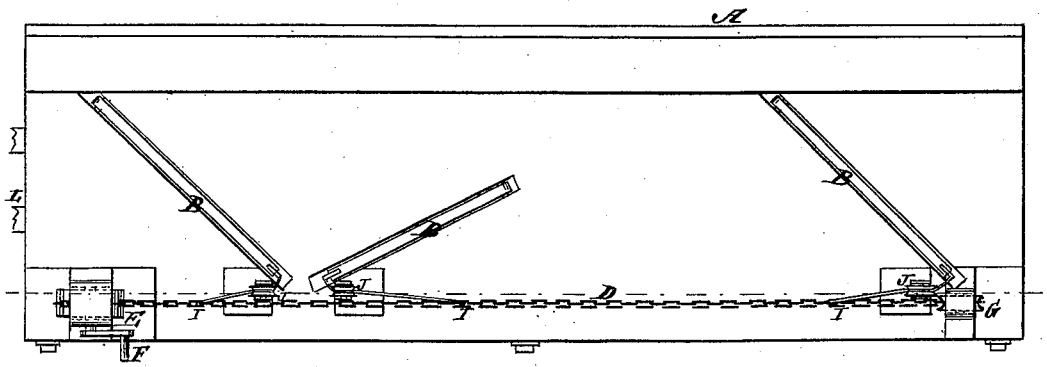
Figure 2:
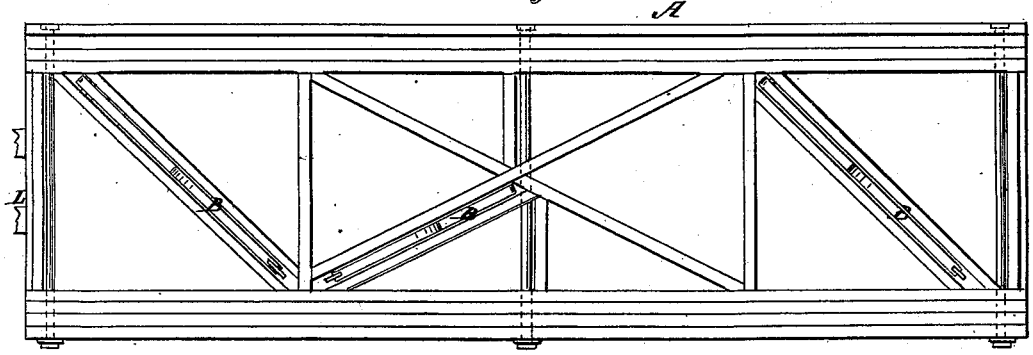
Figure 3:
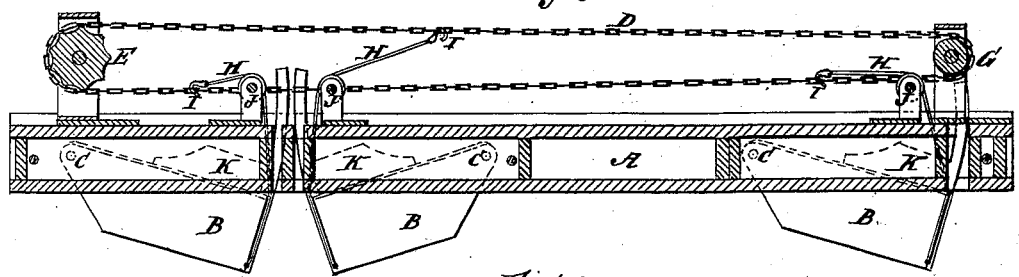
Figure 4:
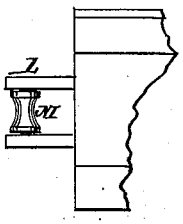

In the accompanying drawing, Figure 1 represents a top or plan view of the boom. Fig. 2 is a view of the boom, having the planking removed, so as to show the interior. Fig. 3 is a longitudinal section of Fig. 1, taken on the line $x$ $x$. Fig. 4 is a detail, showing the hitching device and roller which is on one end of the boom.

Similar letters of reference indicate corresponding parts.

A is the boom, made of strong timbers and hollow, braced and bolted together, as seen in Fig. 2. B represents sheer or center boards therein, which work up and down in diagonal slots made entirely through the boom. These center-boards are pivoted at one end, as seen at C, and are arranged so that the other end will drop down below the boom, as seen in Fig. 3, and so that it may be raised by means of the chains up into the diagonal slots, so as to be secure from injury when not required. D is the revolving chain. E is a chain-pulley, on the end of the shaft of which is the crank F. The chain extends nearly the entire length of the boom, and runs over the pulley G. H are short chains or ropes attached to the ends of the center-boards and to the main revolving chains by hooks I after running over the pulleys J. When the chain D is revolved in one direction it will be seen that the center-boards will be raised, and when the motion of the chain is reversed the center-boards will drop by their own gravity, as seen in Fig. 3. K represents weights on the center-boards to insure their rapid action. L is a hitching device connected with one end of the boom, having a roller, $m$, which bears against a post or pile set in the water. This roll revolves on its centers, and rises and falls as the water rises and falls. The opposite end of the boom is lashed or fastened in any substantial manner to a pile or fixture on the shore, so that it may be swung round to close a channel, or be opened to allow steamboats and other river-craft, as well as saw-logs, to pass. In making these movements back and forth the center-boards are brought into requisition, and, as the current greatly facilitates these movements, the center-boards are placed so as to act to carry the boom in either direction.

This boom may be made water-tight, so as to be light and easily handled, and in sections, if desired.

When sunken trees and other floating rubbish pass under the boom the center-boards will be raised thereby, and will directly drop back into their places and be effective as before.

Having thus described my invention, I claim as new and desire to secure by Letters Patent—

The combination, with boom A, of pivoted weighted center-boards B, working in diagonal slots, chains D, revolving on pulleys E, and hook-chains H on pulleys J, as and for the purpose specified.

PETER A. PRINCE.

Witnesses:
JAS. A. SHERMAN,
G. M. REYNOLDS.